ABSTRACT intro:

United States Patent [19]

Ogawa et al.

[11] Patent Number: 5,030,611
[45] Date of Patent: Jul. 9, 1991

[54] POROUS CERAMICS MATERIAL

[75] Inventors: Tetsuro Ogawa; Satoshi Fujinuma; Katsumi Kawamura, all of Tokyo, Japan

[73] Assignee: Asahi Kogaku Kogyo K.K., Tokyo, Japan

[21] Appl. No.: 261,214

[22] Filed: Oct. 24, 1988

[30] Foreign Application Priority Data

Oct. 22, 1987 [JP] Japan .................. 62-266911
May 20, 1988 [JP] Japan .................. 63-123266

[51] Int. Cl.$^5$ .................. B01D 15/08
[52] U.S. Cl. .................. 502/439; 501/1; 501/80; 210/198.2; 210/502.1; 210/503; 423/308
[58] Field of Search .......... 501/180, 102, 127, 133; 502/439; 210/198.2, 502.1, 503; 423/308

[56] References Cited

U.S. PATENT DOCUMENTS

| | | | |
|---|---|---|---|
| 4,071,369 | 1/1978 | Kurz et al. | 106/40 R |
| 4,113,500 | 9/1978 | Ebihara et al. | 501/1 |
| 4,207,306 | 6/1980 | Jurcho | 501/1 X |
| 4,481,175 | 11/1984 | Iino et al. | 423/308 |
| 4,693,986 | 9/1987 | Vit et al. | 501/1 |
| 4,698,317 | 10/1987 | Inoue et al. | 501/9 |
| 4,711,769 | 12/1987 | Inoue et al. | 423/308 |
| 4,772,573 | 9/1988 | Toriyama et al. | 501/1 |
| 4,781,904 | 11/1988 | Tagaya et al. | 423/308 |
| 4,794,171 | 12/1988 | Tagaya et al. | 502/439 X |
| 4,836,994 | 6/1989 | Inoue et al. | 423/308 |
| 4,874,511 | 10/1989 | Kawasaki et al. | 210/198.2 |

FOREIGN PATENT DOCUMENTS

| | | |
|---|---|---|
| 52-64199 | 5/1977 | Japan . |
| 619075 | 10/1979 | Japan . |
| 62-142565 | 6/1987 | Japan . |
| 2652611 | 5/1977 | Netherlands . |
| 2725665 | 12/1977 | Netherlands . |

OTHER PUBLICATIONS

*Journal of Liquid Chromatography,* vol. 9(16), pp. 3543 to 3557 (1986).
Reports of the Institute for Medical and Dental Engineering (Tokyo Medical and Dental University), vol. 16, pp. 31–38 (1982).

*Primary Examiner*—Karl Group
*Attorney, Agent, or Firm*—Sughrue, Mion, Zinn, Macpeak & Seas

[57] ABSTRACT

A porous ceramics material produced by the process comprising the steps of (i) mixing two or more ceramics in such a manner that at least one of the ceramics is different in sinterability from the others and is mixed in an amount of from 1 to 99 wt % based on the total amount of the ceramics; and (ii) sintering thus obtained mixture; a packing for chromatography comprising the porous ceramics material; and a process for producing the porous ceramics material.

10 Claims, 9 Drawing Sheets

POROUS CERAMICS MATERIAL

FIELD OF THE INVENTION

The present invention relates to a porous ceramics material, and particularly relates to a porous ceramics material of which porous diameter is properly controlled.

BACKGROUND OF THE INVENTION

The pore diameter of porous ceramics materials generally depends on the size of the primary particles. Conventionally, when larger pore diameter is required, a compound which disappears in sintering (e.g., organic resins) is mixed with the starting ceramics powder, and the mixture is then sintered. In this method, however, a defatting device which removes a gas generating from such a compound disappearing in sintering is required, and thus the production cost becomes high. Moreover, when the specific gravity of the compound disappearing in sintering is different from that of the ceramics powder, it is difficult to mix these ingredients uniformly so that porous ceramics materials having a uniform pore diameter cannot obtained.

Hydroxyapatite is similar in nature to inorganic main components of bones and teeth and has excellent biocompatibility, so it has been utilized as a ceramic bioimplant material exemplified by artificial tooth roots, artificial bones, etc. Tricalcium phosphate is also known to have equally good biocompatibility.

What is interesting about hydroxyapatite is that it also has good characteristics for use as a packing in chromatography and it has been used in separating and purifying biomaterials such as proteins, enzymes, nucleic acids, etc. In recent years, products of porous spherical hydroxyapatite having good separating ability have been developed and commercialized; this type of hydroxyapatite holds much promise for us in a broad range of applications.

One method for producing a packing from hydroxyapatite comprises synthesizing a hydroxyapatite slurry by a wet method, granulating the slurry by a suitable method such as spray drying, and shaping the particles into a desired form. The particles produced by this method have a disadvantage in that because of the weak binding of primary particles, the secondary particles which are made up of such primary particles are low in strength and are not highly durable. The strength of the particles can be increased by heat treating them at elevated temperatures ($\geq 700°$ C.) so that the primary particles are sintered. This method is effective in improving the strength of the particles but disadvantageously the ability of the treated particles to adsorb acidic proteins such as bovine serum albumin (BSA) is lowered.

SUMMARY OF THE INVENTION

An object, therefore, of the present invention is to provide a porous ceramics material in which the pore diameter is properly controlled.

The above and other objects and effects of the present invention will be apparent from the following description.

These objects of the present invention can be attained by a porous ceramics material produced by the process comprising the steps of (i) mixing two or more ceramics in such a manner that at least one of the ceramics is different in sinterability from the others and is mixed in an amount of from 1 to 99 wt. % based on the total amount of the ceramics; and (ii) sintering the thus obtained mixture.

DETAILED DESCRIPTION OF THE INVENTION

Figure 1:
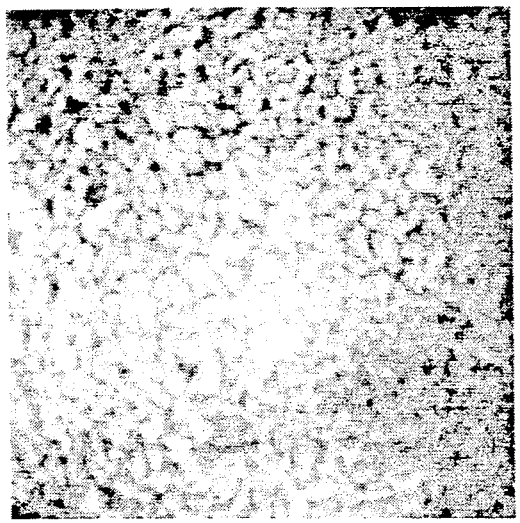
FIG. 1 is a scanning electron micrograph of the packing comprising the porous ceramics of the present invention prepared in Example 1.

The term 'sinterability' means the behavior of a compound in sintering, and described specifically, e.g., in Nippon Ceramics Kyokai Gakujutsu Ronbun Shi (Academic Monograph Journal of Japan Ceramics Society), Vol. 96(9), pages 907 to 913 (1988), ditto, vol. 96(5), pages 595 to 598 (1988), J. Am. Ceram. Soc., vol. 70(11), pages C-329 to C-334 (1987), ditto, vol. 70(10), pages C-232 to C-236 (1987), and Ceramics Zairyo Gijushu Shusei (Compilation of Ceramics Material Technology), pages 67 to 74 published by Sangyo Gijushu Center, Co., Ltd., Japan in Apr. 10, 1979.

The combination of the ceramics used in the present invention may be optionally selected so that the sinterability of at least one ceramics is different from that of the others.

Examples of the ceramics include hydrodxyapatite, a calcium phosphate compound (such as tricalcium phosphate), alumina, silica, zirconia, and mixtures thereof. Among these, hydroxyapatite is preferably used, and the combination of hydroxyapatite and tricalcium phosphate is more preferably used because of their excellent properties such as biocompatibility.

The suitable mixing ratio of the ceramics depends on the objective pore diameter and the difference in sinterability between the ceramics, but is selected so that the amount of at least one of the ceramics is 1 to 99 wt. %, preferably from 5 to 95 wt. %, and more preferably from 20 to 80 wt. %, based on the total amount of the ceramics.

The sintering temperature and the sintering time are not particularly limited, and can be determined depending on the kinds of the ceramics, the objective pore diameter and the like.

The porous ceramics material of the present invention can be used in any shape including molded articles, particles, etc.

In the case where the ceramics material of the present invention is used in the form of particles, e.g., used as a packing for chromatography, the ceramics are mixed in the proportions already specified and the mixture is granulated into generally spherical particles by a variety of known methods of granulation including a spray drying method and a rolling/tumbling method.

In the spray drying method, a slurry having the ceramics dispersed in water is sprayed at a temperature of from about 100° to 250° C. to form generally spherical granules. In the rolling/tumbling method, the compounds are placed on a plate which is rotated to agglomerate them into granules.

Hydroxyapatite which can be used in the present invention can be synthesized by various known methods including a wet method in which phosphoric acid or a water-soluble phosphate salt is reacted with a water-soluble calcium compound in an aqueous solution, and a dry method in which a phosphoric acid compound is reacted with a calcium compound under high temperatures.

The wet process is described, e.g., in Wallaeys, R.,. *Ann. Chim. (Paris)*, vol. 7, 808 and 823 (1952); Moreno, E. C., Gregory, T. M., Brown, W. E., *J. Res. Nat. Bur. Stand.*, vol. 72A, 773 (1968); and L. C. Bell, H. Mika, B. J. Kruger, *Archs. Oral. Biol.*, vol. 23, 329 to 336 (1978). The dry process is described, e.g., in Quinaux, N., *Arch. Intern. Physiol. Biochim.*, vol. 72, 337 (1964) and *Chem. Abstr.*, vol. 60, 15418a (1964); and Liteanu, C., Macarouci, D., *Studii Cercetari Chim.*, vol. 13, 157 (1962).

Tricalcium phosphate which can be used in the present invention can also be synthesized by various known methods including the wet method and the dry method as described above.

Whichever method is used, tricalcium phosphate is prepared by reacting a phosphoric acid compound with a calcium compound to provide a Ca/P ratio of 1.5, and hydroxyapatite is prepared by reacting a phosphoric acid compound and a calcium compound to provide a Ca/P ratio that exceeds 1.5 and preferably not exceeding 1.666. In preparing hydroxyapatite, if the Ca/P ratio exceeds 1.666, calcium oxide which causes adverse effects on the human body will be formed during the sintering step.

In the case where the combination of hydroxyapatite and tricalcium phosphate is used as the caramics, when hydroxyapatite having a Ca/P ratio exceeding 1.5 but which is less than 1.666 is fired at a temperature between 800° and 1,160° C., a mixture of tricalcium phosphate having a Ca/P ratio of 1.5 and hydroxyapatite having a Ca/P ratio of 1.666 is formed. Therefore, in the case where the combination of hydroxyapatite and tricalcium phosphate is employed, hydroxyapatite of which Ca/P ratio exceeds 1.5 but is less than 1.666 may be used as a starting material, instead of mixing separately prepared tricalcium phosphate and hydroxyapatite, and this starting material may be granulated or molded and fired. In this case, by using hydroxyapatite having a Ca/P ratio in the range of from 1.501 to 1.658, a mixture of tricalcium phosphate and hydroxyapatite in proportions that are within the range specified above can be obtained.

The sintering temperature in preparing the ceramics material of the present invention using hydroxyapatite is preferably 700° C. or more because if it is less than 700° C., the extent of sintering becomes insufficient and the mechanical strength of the ceramics material is lowered. The upper limit of the sintering temperature is not particularly limited, but when the decomposition of hydroxyapatite should be avoided, the sintering temperature is preferably 1,400° C. or less.

The porous ceramics material of the present invention can be advantageously used as packings for chromatography, bioimplant materials, filters, catalysts, etc.

When the ceramics material of the present invention is used as biomaterials, filters and catalysts, the pore diameter thereof is preferably from 0.005 $\mu$m to 2 mm.

When hydroxyapatite is used as the ceramics, the porous ceramics material of the present invention in the form of particles is preferably used as a packing for chromatography, e.g., that for separating and purifying various biomaterials such as proteins, enzymes, nucleic acids, etc.

The preferred average pore diameter of the packing for chromatography comprising the porous ceramics material of the present invention is from 0.005 to 0.1 $\mu$m for low molecular weight solutes, and from 0.1 to 5 $\mu$m for high molecular weight solutes such as DNA.

The porosity of the packing according to the present invention is preferably 5% or more, more preferably from 10 to 65%, and especially preferably from 20 to 50%.

The shape of the packing according to the present invention is not limited to complete sphere, and may be substantially spherical (e.g., an egg-like shape, an ellipsoidal shape).

The average diameter of the packing according to the present invention is not particularly limited, and is preferably from 1 to 100 $\mu$m. If it is less than 1 $\mu$m, the penetration resistance of the mobile phase in the column filled with the packing becomes high, and if it is more than 100 $\mu$m, the separation performance of the column tends to be deteriorated.

In the packing for chromatography according to the present invention, when the combination of hydroxyapatite and tricalcium phosphate is used as the ceramics, a packing for chromatography which has high mechanical strength and yet exhibits a high ability to adsorb acidic proteins can be obtained.

As described above, the porous ceramics material of the present invention provides the packing for chromatography having high biocompatibility in which the mechanical strength is excellent and the pore diamter is properly controlled.

The following examples are provided for the purpose of further illustrating the present invention but should in no way be taken as limiting. Unless otherwise indicated, all parts, ratios, percents, etc. are by weight.

EXAMPLE 1

An aqueous solution of phosphoric acid and a suspension of calcium hydroxide was mixed to provide a Ca/P ratio of 1.578 and subjected to reaction by a known method to obtain a hydroxyapatite slurry having a Ca/P ratio of 1.578. That is, to 20 l of a calcium hydroxide slurry having a concentration of 0.5 M/l, 20 l of an aqueous solution of phosphoric acid having a concentration of 0.317 M/l was added dropwise at a rate of 30 cc/min while stirring. After completing the addition, the reaction mixture was allowed to stand for 72 hours to obtain a hydroxyapatite slurry. The temperature of the reaction mixture was 25° C. The slurry was spray-dried with a spray drier ('Mobile Minor Model' manufactured by Ashizawaniro Co., Ltd.). The resulting granulation consisting of generally spherical particles was sintered at 900° C. for 4 hours to produce a packing comprising the porous ceramics material of the present invention. The packing had an average particle diameter of 20 μm and an average pore diameter of 0.2 μm. It consisted of 53 wt. % tricalcium phosphate and 47 wt. % hydroxyapatite.

Figure 2:
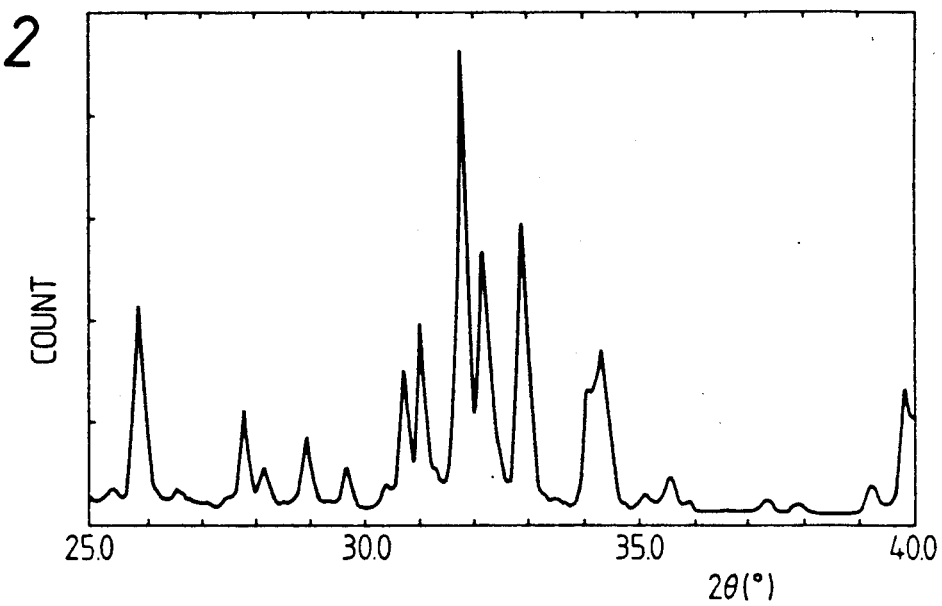
FIG. 2 is a result of X-ray diffractiometry of the packing comprising the porous ceramics of the present invention prepared in Example 1.

The scanning electron micrograph and the result of X-ray diffractiometry of the packing obtained are shown in FIGS. 1 and 2, respectively.

Figure 3:
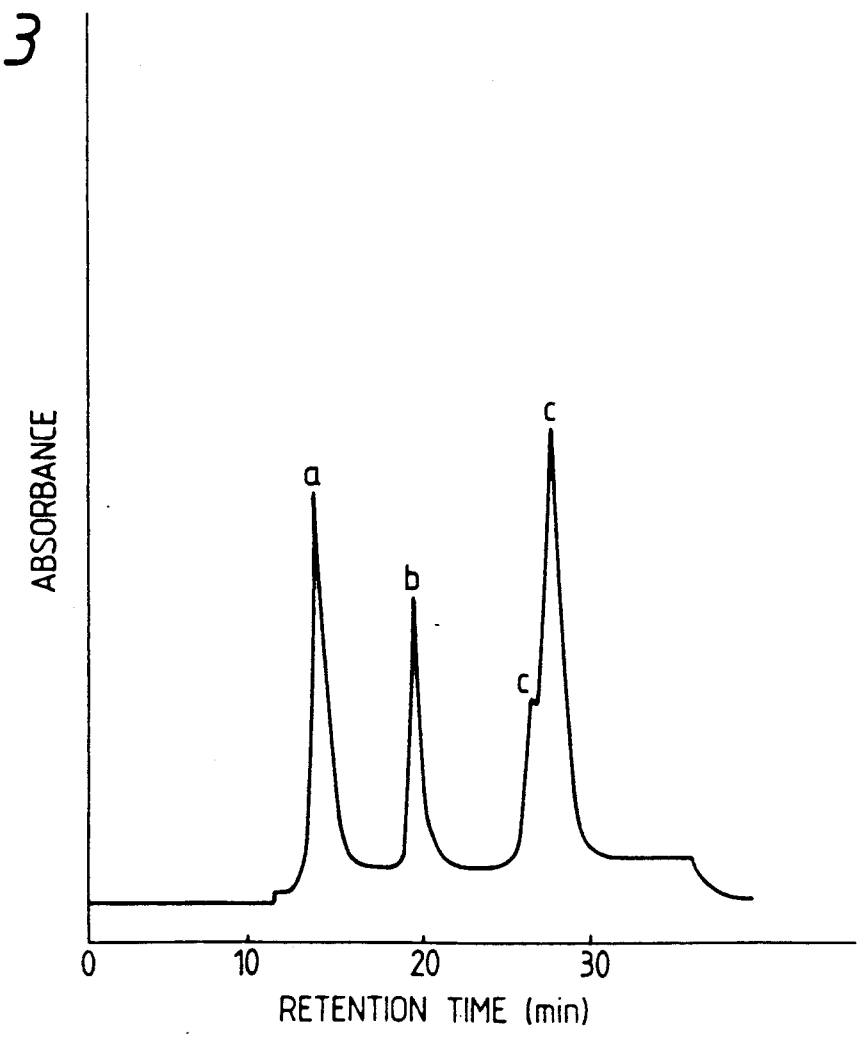
FIG. 3 is a chromatogram obtained by using the packing comprising the porous ceramics of the present invention prepared in Example 1.

The packing produced was loaded into a stainless steel column having an inside diameter of 7.5 mm and a length of 100 mm. Using this column and with a sodium phosphate buffered solution being used as a mobile phase, separation of standard proteins (BSA, lysozyme and cytochrome c) was performed by a linear gradient method over a period of 30 minutes from 10 mM to 400 mM at a flow rate of 1.0 ml/min. The chromatogram obtained is shown in FIG. 3.

EXAMPLE 2

A packing consisting of 77 wt. % tricalcium phosphate and 23 wt. % hydroxyapatite having an average pore diameter of 0.5 μm and an average particle diameter of 20 m was prepared in the same manner as in Example 1.

Figure 4:
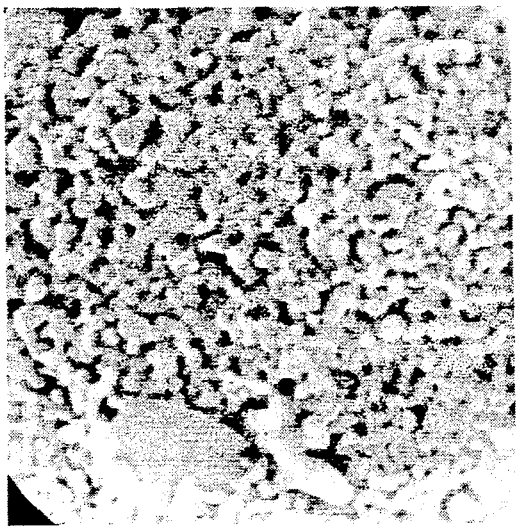
FIG. 4 is a scanning electron micrograph of the packing comprising the porous ceramics of the present invention prepared in Example 2.
Figure 5:
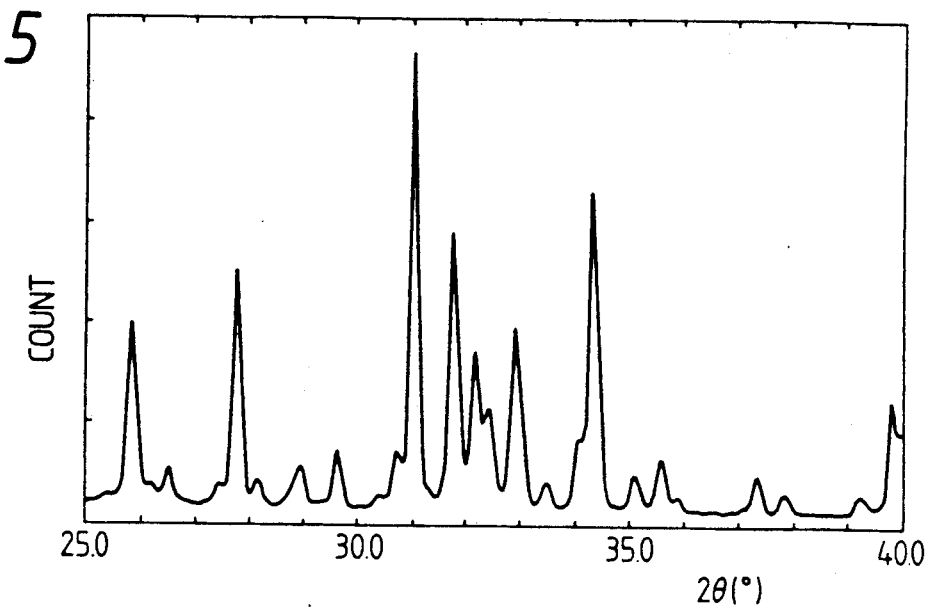
FIG. 5 is a result of X-ray diffractiometry of the packing comprising the porous ceramics of the present invention prepared in Example 2.

The scanning electron micrograph and the result of X-ray diffractiometry of the packing obtained are shown in FIGS. 4 and 5, respectively.

Figure 6:
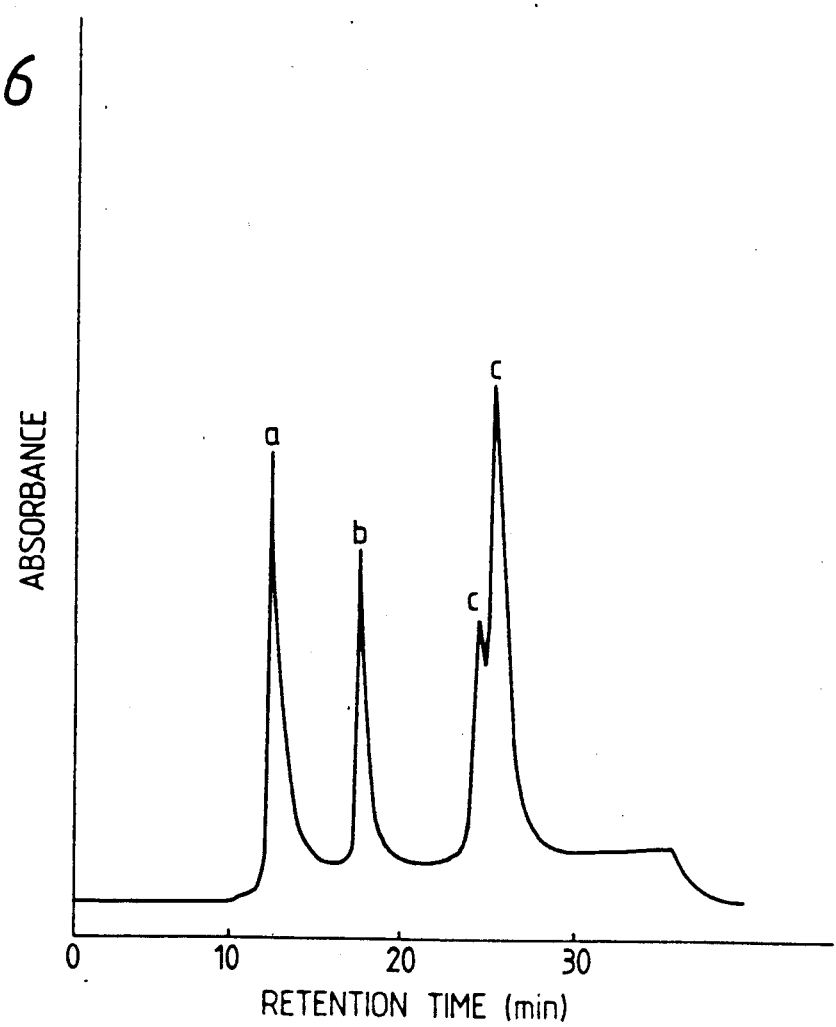
FIG. 6 is a chromatogram obtained by using the packing comprising the porous ceramics of the present invention prepared in Example 2.

By using this packing, the standard proteins were separated in the same manner as in Example 1. The chromatogram obtained is shown in FIG. 6.

EXAMPLE 3

A packing consisting of 93 wt. % tricalcium phosphate and 7 wt. % hydroxyapatite having an average pore diameter of 0.8 μm and an average particle diameter of 20 μm was prepared in the same manner as in Example 1.

Figure 7:
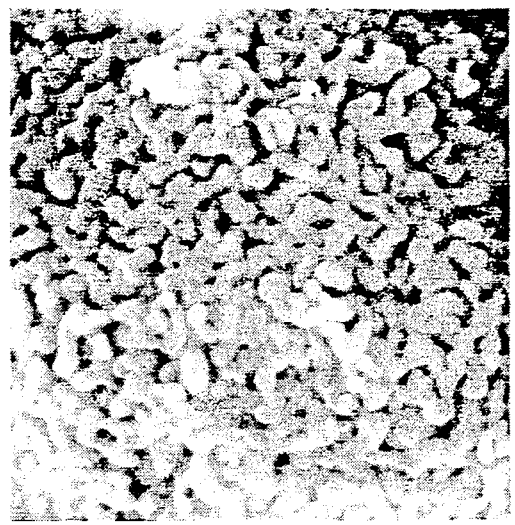
FIG. 7 is a scanning electron micrograph of the packing comprising the porous ceramics of the present invention prepared in Example 3.
Figure 8:
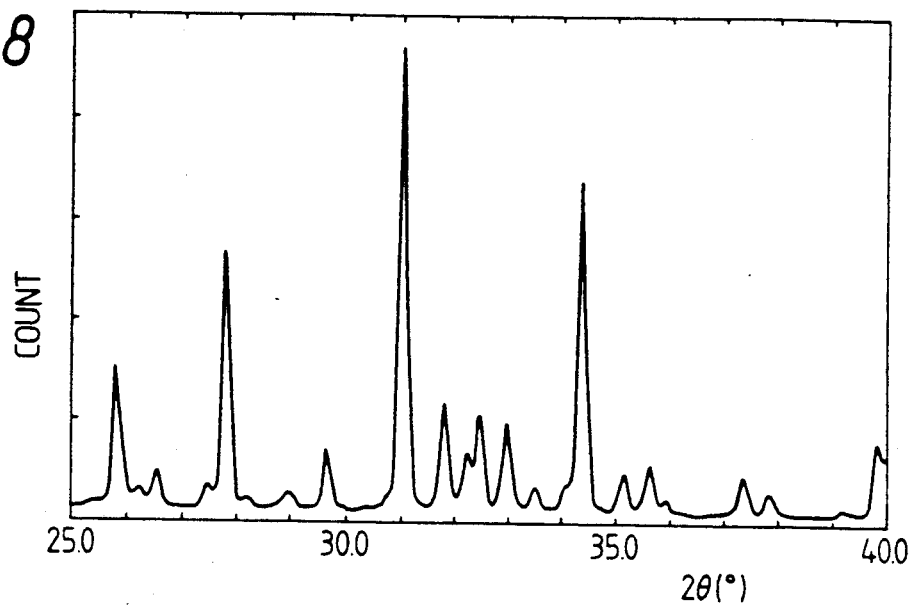
FIG. 8 is a result of X-ray diffractiometry of of the packing comprising the porous ceramics of the present invention prepared in Example 3.

The scanning electron micrograph and the result of X-ray diffractiometry of the packing obtained are shown in FIGS. 7 and 8, respectively.

Figure 9:
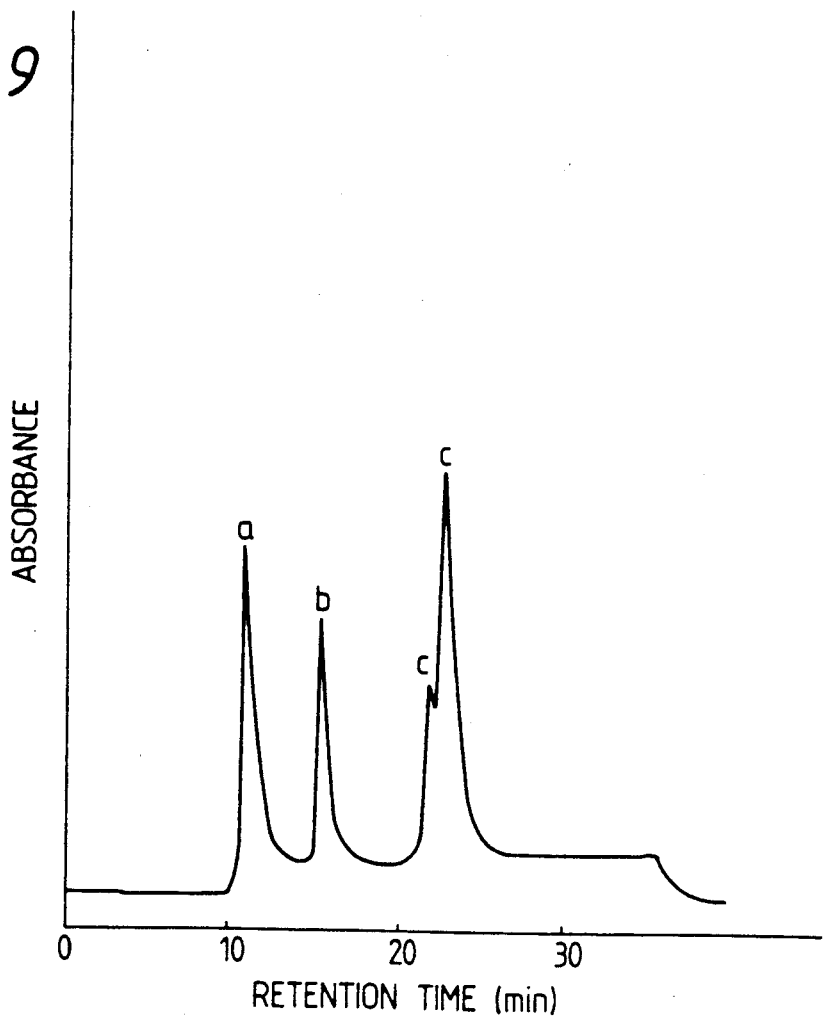
FIG. 9 is a chromatogram obtained by using the packing comprising the porous ceramics of the present invention prepared in Example 3.

By using this packing, the standard proteins were separated in the same manner as in Example 1. The chromatogram obtained is shown in FIG. 9.

COMPARATIVE EXAMPLE 1

A packing consisting of hydroxyapatite having a Ca/P ratio of 1.666 which has an average pore diameter of 0.1 μm and an average particle diameter of 20 μm was prepared in the same manner as in Example 1.

Figure 10:
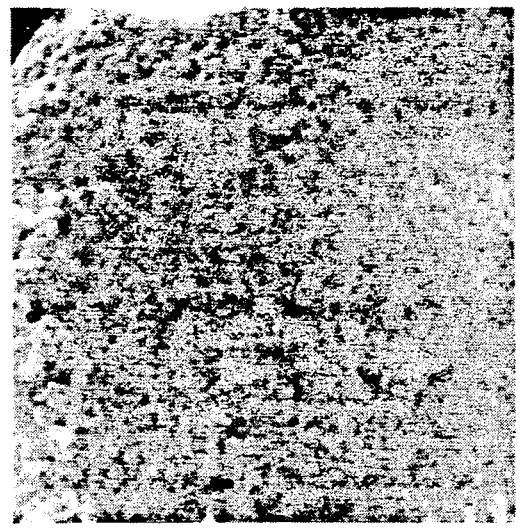
FIG. 10 is a scanning electron micrograph of the packing prepared in Comparative Example 1.
Figure 11:
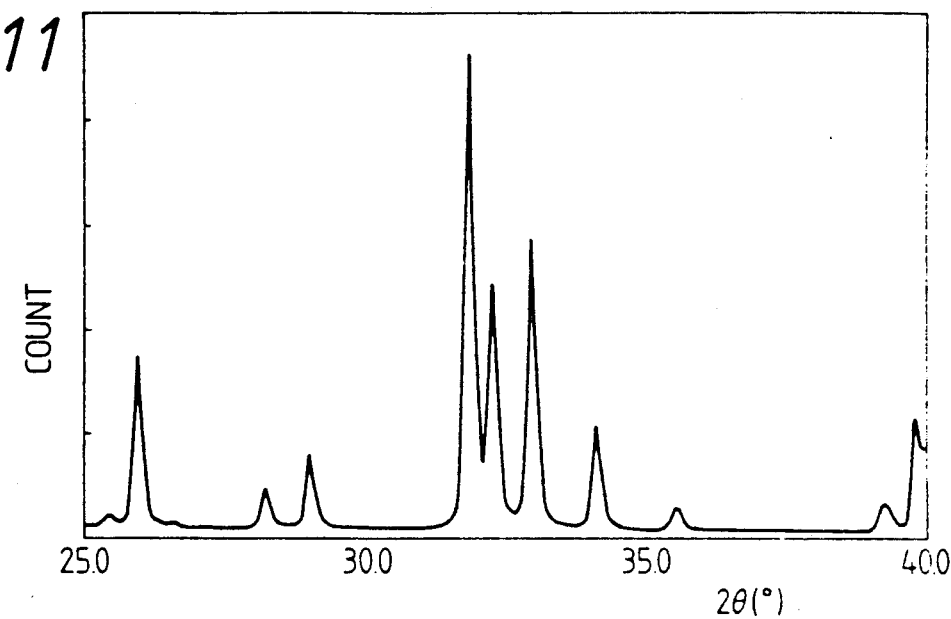
FIG. 11 is a result of X-ray diffractiometry of the packing prepared in Comparative Example 1.

The scanning electron micrograph and the result of X-ray diffractiometry of the packing obtained are shown in FIGS. 10 and 11, respectively.

Figure 12:
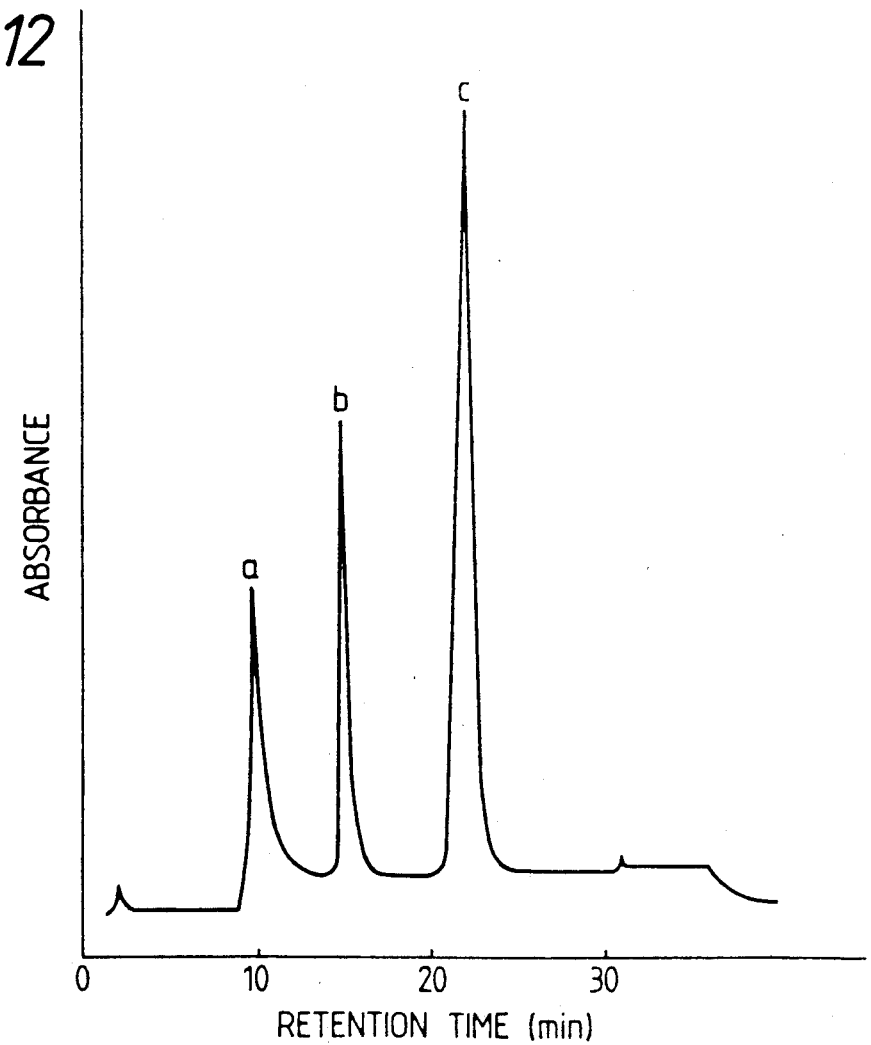
FIG. 12 is a chromatogram obtained by using the packing prepared in Comparative Example 1.

By using this packing, the standard proteins were separated in the same manner as in Example 1. The chromatogram obtained is shown in FIG. 12.

COMPARATIVE EXAMPLE 2

A packing consisting of tricalcium phosphate which has an average pore diameter of 2 μm and an average particle diameter of 20 μm was prepared in the same manner as in Example 1.

Figure 13:
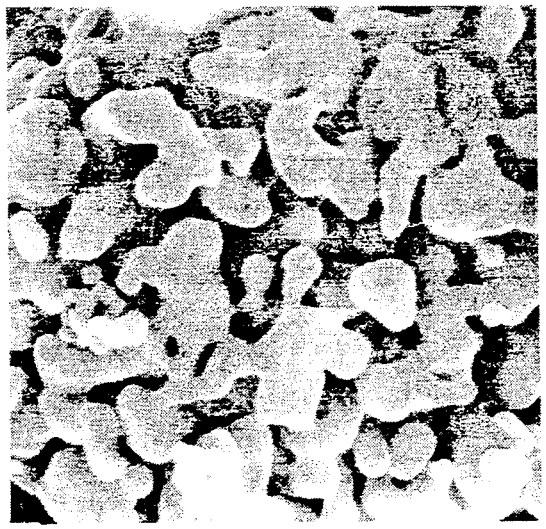
FIG. 13 is a scanning electron micrograph of the packing prepared in Comparative Example 2.
Figure 14:
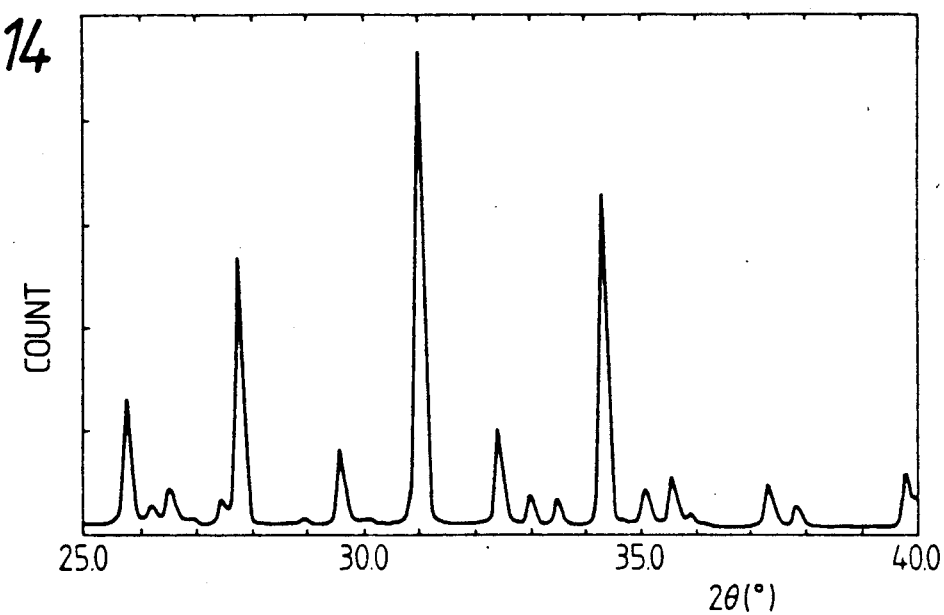
FIG. 14 is a result of X-ray diffractiometry of of the packing prepared in Comparative Example 2.

The scanning electron micrograph and the result of X-ray diffractiometry of the packing obtained are shown in FIGS. 13 and 14, respectively.

Figure 15:
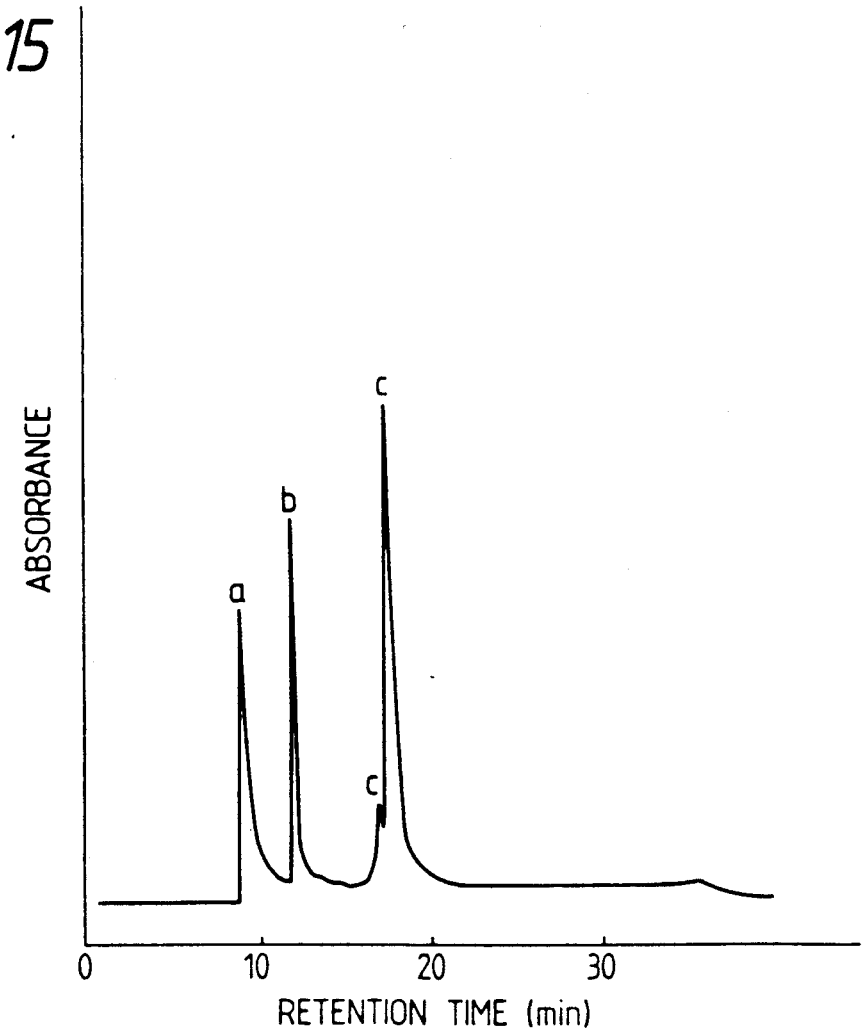
FIG. 15 is a chromatogram obtained by using the packing prepared in Comparative Example 2.

By using this packing, the standard proteins were separated in the same manner as in Example 1. The chromatogram obtained is shown in FIG. 15.

In the chromatograms, the y-axis represents the absorbance at 280 nm and the x-axis represents the retention time in minutes. The symbols used in these graphs denote the following: a, peak of BSA; b, peak of lysozyme; and c, peak of cytochrome c.

From the results obtained in Examples 1 to 3 and Comparative Examples 1 and 2, it can be understood that the packing comprises the porous ceramics material of the present invention is effective for the separation of proteins similar to a packing composed of hydroxyapatite only.

EXAMPLE 4

An aqueous solution of phosphoric acid and a suspension of calcium hydroxide was mixed to provide a Ca/P ratio of 1.607 and subjected to reaction by a known method to obtain a hydroxyapatite slurry having a Ca/P ratio of 1.607. That is, to 20 l of a calcium hydroxide slurry having a concentration of 0.5 M/l, 20 l of an aqueous solution of phosphoric acid having a concentration of 0.311 M/l was added dropwise at a rate of 30 cc/min while stirring. After completing the addition, the reaction mixture was allowed to stand for 72 hours to obtain a hydroxyapatite slurry. The temperature of the reaction mixture was 25° C. The slurry was spray-dried with a spray drier ('Mobile Minor Model' manufactured by Ashizawaniro Co., Ltd.). The resulting granulation consisting of generally spherical particles was sintered at 950° C. for 4 hours to produce a packing within the scope of the present invention. The packing had an average particle size of 20 μm and a porosity of about 50%. It consisted of 32 wt. % tricalcium phosphate and 68 wt. % hydroxyapatite.

Figure 16:
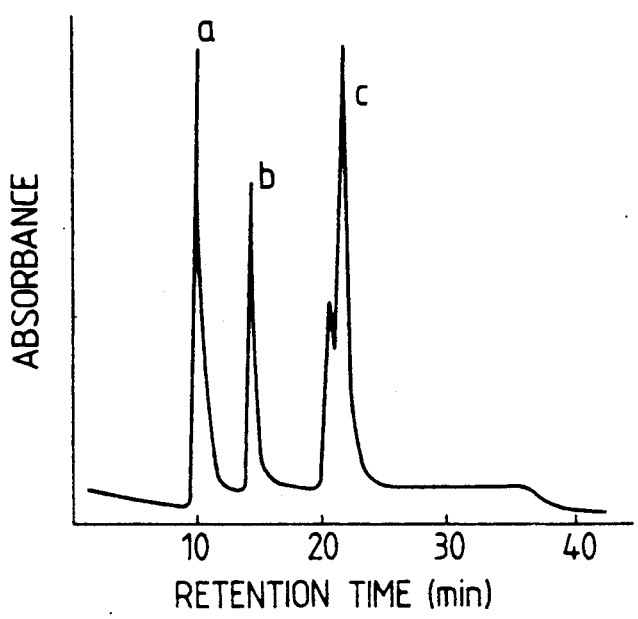
FIG. 16 is a chromatogram obtained by using the packing comprising the porous ceramics of the present invention prepared in Example 4.

By using this packing, the standard proteins were separated in the same manner as in Example 1. The chromatogram obtained is shown in FIG. 16.

COMPARATIVE EXAMPLE 3

The same experiment as in Example 4 was conducted using a packing that was solely composed of hydroxyapatite having a Ca/P ratio of 1.666 (particle size, 2 μm; fired at 950° C.). The chromatogram obtained is shown in FIG. 17, from which one can see the peak of BSA becomes broad because the BSA was not adsorbed by the packing.

In the chromatograms, the axises and symbols represent the same meanings as above.

Figure 17:
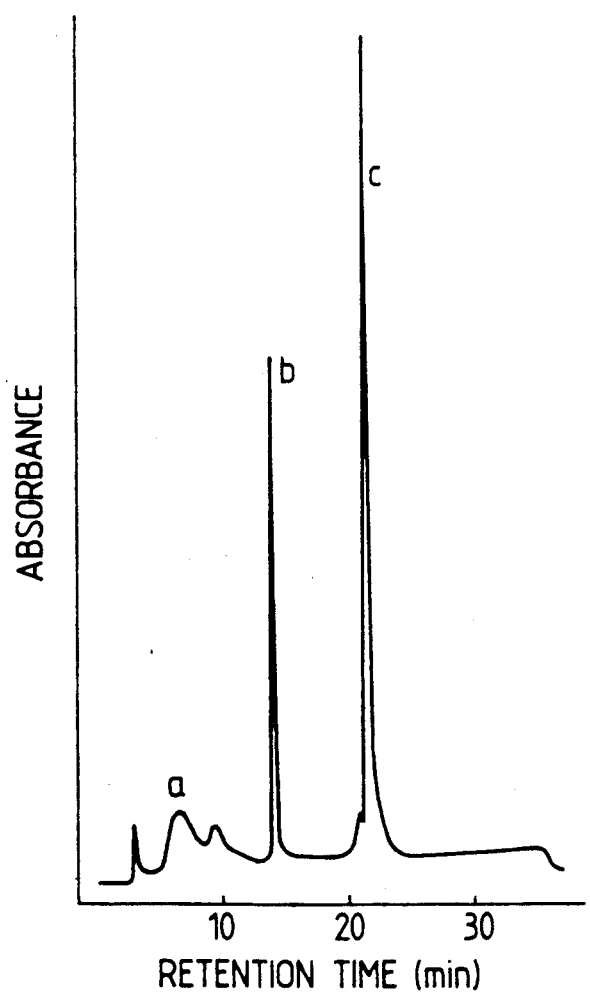
FIG. 17 is a chromatogram obtained by using the packing prepared in Comparative Example 3.

It is understood from the comparison between FIGS. 6 and 17, the packing comprising the porous ceramics material of the present invention using the combination of hydroxyapatite and tricalcium phosphate is effective for the purpose of separating acidic proteins.

As described in the foregoing, the present invention provides a porous ceramics material in which the pore diameter is properly controlled. When hydroxyapatite is used as the ceramics, the porous ceramics material of the present invention can be effectively used as a packing for chromatography for separating biomaterials. When the combination of hydroxyapatite and tricalcium phosphate is employed, the packing according to the present invention is particularly effective for separating acidic proteins.

While the invention has been described in detail and with reference to specific embodiments thereof, it will be apparent to one skilled in the art that various changes and modifications can be made therein without departing from the spirit and scope thereof.

What is claimed is:

1. A packing for chromatography comprising a porous ceramic material consisting of hydroxyapatite and tricalcium phosphate which is produced by a process comprising the steps of (i) mixing hydroxyapatite and tricalcium phosphate, wherein said tricalcium phosphate is present in an amount of from 1 to 99 wt. % based on the total amount of said hydroxyapatite and said tricalcium phosphate; and (ii) sintering the thus obtained mixture.

2. A packing for chromatography as claimed in claim 1, wherein the amount of said tricalcium phosphate is from 5 to 95 wt. % based on the total amount of said hydroxyapatite and said tricalcium phosphate.

3. A packing for chromatography as claimed in claim 2, wherein the amount of said tricalcium phosphate is from 20 to 80 wt. % based on the total amount of said hydroxyapatite and said tricalcium phosphate.

4. A packing for chromatography as claimed in claim 1, wherein said packing for chromatography has an average pore diameter of from 0.005 to 0.1 μm.

5. A packing for chromatography as claimed in claim 1, wherein said packing for chromatography has an average pore diameter of from 0.1 to 5 μm.

6. A packing for chromatography as claimed in claim 1, wherein said mixture is sintered at from 700° to 1,400° C.

7. A packing for chromatography as claimed in claim 1, wherein said packing for chromatography is in a substantially spherical form.

8. A packing for chromatography as claimed in claim 1, wherein said packing for chromatography has a porosity of 5% or more.

9. A process for producing a porous ceramic material consisting of hydroxyapatite and tricalcium phosphate comprising the steps of (i) mixing hydroxyapatite and tricalcium phosphate, wherein said tricalcium phosphate is present in an amount of from 1 to 99 wt. % based on the total amount of said hydroxyapatite and said tricalcium phosphate; and (ii) sintering the thus obtained mixture.

10. A column for chromatography packed with a porous ceramic material consisting of hydroxyapatite and tricalcium phosphate, wherein said porous ceramics material is produced by a process comprising the steps of (i) mixing hydroxyapatite and tricalcium phosphate, wherein said tricalcium phosphate is present in an amount of from 1 to 99 wt. % based on the total amount of said hydroxyapatite and said tricalcium phosphate; and (ii) sintering the thus obtained mixture.

* * * * *